Nov. 12, 1968　　　R. RIEDEL ET AL　　　3,410,377
BOTTLE FILLING MACHINE

Filed Sept. 26, 1966　　　　　　　　　　2 Sheets-Sheet 1

INVENTORS:
Rudolf Riedel
Gerhard Uth
By
Walter Becker

United States Patent Office 3,410,377
Patented Nov. 12, 1968

3,410,377
BOTTLE FILLING MACHINE
Rudolf Riedel and Gerhard Uth, Bad Kreuznach, Germany, assignors to Seitz-Werke G.m.b.H., Bad Kreuznach, Germany
Filed Sept. 26, 1966, Ser. No. 581,802
Claims priority, application Germany, Oct. 1, 1965, S 99,887
9 Claims. (Cl. 192—.02)

ABSTRACT OF THE DISCLOSURE

A bottle filling machine, especially vacuum filling machine, with a filling container adjustable as to height by a screw drive, and with a float controlling the liquid level in the container, said float being connected to a supporting member likewise provided with a screw drive and operatively connected with the container drive through the intervention of a chain adapted to be made ineffective by a disengageable clutch interposed in the driving connection between the container drive and the float drive and adapted at an upper or lower end position of the filling container to be prepared by control means for engagement or disengagement, while the control means are in each instance controlled by an upper or lower abutment means in the form of a limit switch or the like for limiting the container stroke.

---

The present invention relates to a bottle filling machine with filling container and filling container float adjustable as to height. In order to be able to adapt bottle filling machines to the various bottle sizes, it has been known for quite some time to design the bottle filling machines in such a way that they can be adjusted as to height. By means of axial movements of a central spindle carrying the filling container (such axial movements being effected by a screw drive), it is possible to move the filling container immediately to its correct level in conformity with the size of the bottles being supplied for filling. Such adjusting devices additionally permit a better cleaning of the machine because the filling container is more easily accessible to the lower end position of the spindle drive.

With one-container machines, especially vacuum filling machines of this type, it is also known to equip the filling container with a float controlling the liquid level. In order to be able in an easy and simple manner to remove such rather large control elements, when cleaning the machine, it is also known to connect the float to a supporting member which is adjustable as to height and which in most instances consists of a horizontal cantilever arranged on a supporting collar of the machine frame and adjustable by a spindle drive in upward and downward direction. The screw drive of the float support is connected to the adjusting drive of the filling container in such a way that while retaining its functional position, the float always follows the height adjustment of the filling container. The automatics of these movements are brought about by a manually operable coupling which, however, has the drawback that at each level of the filling container it is possible to disconnect the drive for the float support from the drive of the filling container. The disengagement of the coupling connection at any random level and a subsequent lowering or dropping of the filling container to its lower end position will, when returning the filling container to a level in conformity with a certain bottle size, make necessary the readjustment of the float in order to maintain the required liquid level in the container. These time consuming adjustments are avoidable only when the driving connection of the two adjusting devices is disconnected in the upper and lower end positions of the filling container and is then again connected. Only by this way of operation, it will be assured that the float will retain its functional position with a filling container adjusted in conformity with the required height of the bottles.

It is, therefore, an object of the present invention to provide a bottle filling machine which will overcome the above-mentioned drawbacks.

It is a further object of this invention to provide a bottle filling machine which, when a faulty operation has been effected, will permit the disconnection of the coupling connection between the adjusting elements for the filling container and the float at any desired location of height of the filling container, while the filling machine will be operational again only when the float has again been adjusted for its functional position.

These and other objects and advantages of the invention will appear more clearly from the following specification in connection with the accompanying drawings, in which:

FIGURE 1 diagrammatically illustrates a longitudinal section through a bottle filling machine according to the invention with a filling container and float adjustable as to height.

Figure 1:
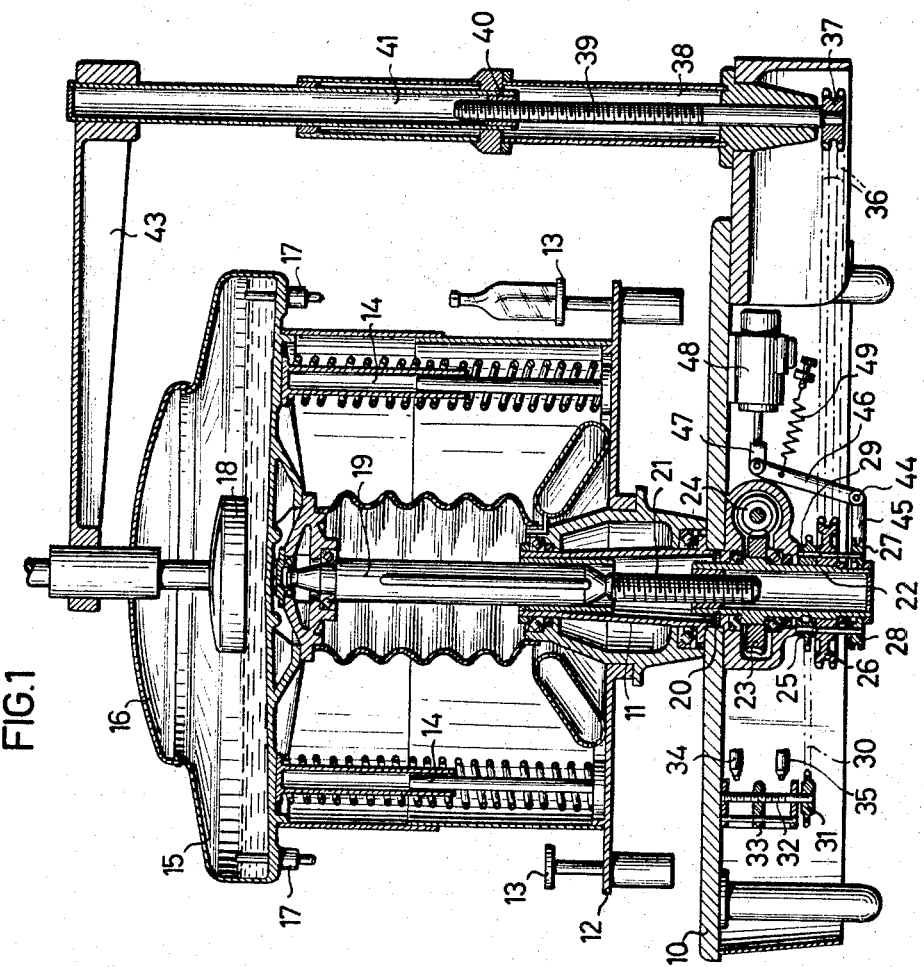

A bottle filling machine, especially vacuum filling machine, with a height adjustable filling container and an adjustable float controlling the liquid level in the container is according to the present invention characterized by a magnetic coupling interposed in the driving connection between the drive for the container and the drive for the float. This magnetic coupling is in an upper and/or lower end position of the filling container, by control means placed into readiness for engagement or disengagement, while the control means are controlled by an upper and/or lower abutment member which may be in the form of a limit switch and which limits the container stroke.

According to a further feature of the present invention, the prepared coupling is by a manually operable switch deenergized or energized for establishing or disconnecting the coupling connection. According to one embodiment of the invention, the coupling prepared for engagement and disengagement may also by means of the container abutments be deenergized or energized for establishing or disconnecting the coupling connection. These abutment members which in most instances are formed by limit switches are in this instance additionally equipped with a control member. As magnetic coupling or clutch, a positive control clutch is suggested which advantageously is equipped with a movable clutch member having followers and with an oppositely located fixed clutch member. The movable clutch member advantageously comprises a ring connected to a coupling linkage. This ring is at the end face provided with a plurality of vertical bolts forming the followers.

Referring now to the drawings in detail, the filling machine substantially comprises a closed box-shaped understructure 10 for receiving the driving and transmission devices, and furthermore comprises a container support 12 which is rotatable about a central column 11 and is equipped with a plurality of bottle supporting plates 13 which can be raised and lowered. The filling machine furthermore comprises a filling container 15 coupled to the container support 12 through the intervention of longitudinally adjustable connecting means 14. Filling container 15 is adapted to be closed at its top by means of a cover 16 and carries a plurality of filling members 17, the number of which corresponds to the number of the respective available bottle supporting plates 13. In the interior of the filling container 15 there is additionally provided a float 18 for controlling the liquid level.

The filling container 15 is adjustable as to height and to this end is mounted on a threaded spindle 19 of a screw drive, said spindle being axially movable in the central column 11. The nut 20 pertaining to the screw drive is stationarily arranged in axial direction in the machine understructure and extends around the threaded portion 21 of the lower spindle end 19. A pipe 22 connected to nut 20 extends downwardly and has mounted on its circumference a worm wheel 23 meshing with a worm 24. Worm 24 is associated with a driving motor (not illustrated). Mounted on pipe 22 is a fixed sprocket wheel 25, a loosely rotatable sprocket wheel 26 and an annular coupling member 27. The member 27 is axially slidable on pipe 22 and has a plurality of upwardly directed pins 28 guided in bores of the wheel 26. Corresponding vertical bores 29 are oppositely arranged in the fixed wheel 25. The fixed wheel 25 is through a chain 30 drivingly connected with the sprocket wheel 31 of a threaded spindle 32 which is adapted to move a control member 33 between an upper and lower limit switch 34 and 35. The vertical path of member 33 is adapted to the adjusting stroke of the filling container 15. A further chain 36 connects the loose wheel 26 with a sprocket wheel 37 which is mounted on the free end of a spindle 39 guided in a vertical column 38 of the machine lower structure 10. A nut 40 meshing with the threaded portion of spindle 39 and connected to the lower end of a pipe 41 longitudinally guided in column 38 forms together with spindle 39 a further screw drive. The free end of pipe 41 carries a horizontal cantilever 43 which extends into the range of the container cover 16. Cantilever 43 has connected thereto the float 18. Pipe 41 and cantilever 43 are secured against rotation for instance by groove and key. This connection is disengageable.

Coupling member 27 is connected to a tiltable lever linkage system 45, 46 which is pivotable about the fixed point 44. The said linkage system is connected to the axial end 47 of a magnetic clutch solenoid 48 and is spring biased by spring 49 toward clutch engaged position. Energization of clutch solenoid 48 will cause the clutch to disengage.

The motor drive acting upon the screw drive 20, 21 through worm 24 and worm wheel 23, and the magnetic clutch solenoid 48 are electrically connected to each other so that the clutch can be closed or open during operation of the motor.

Figure 2:
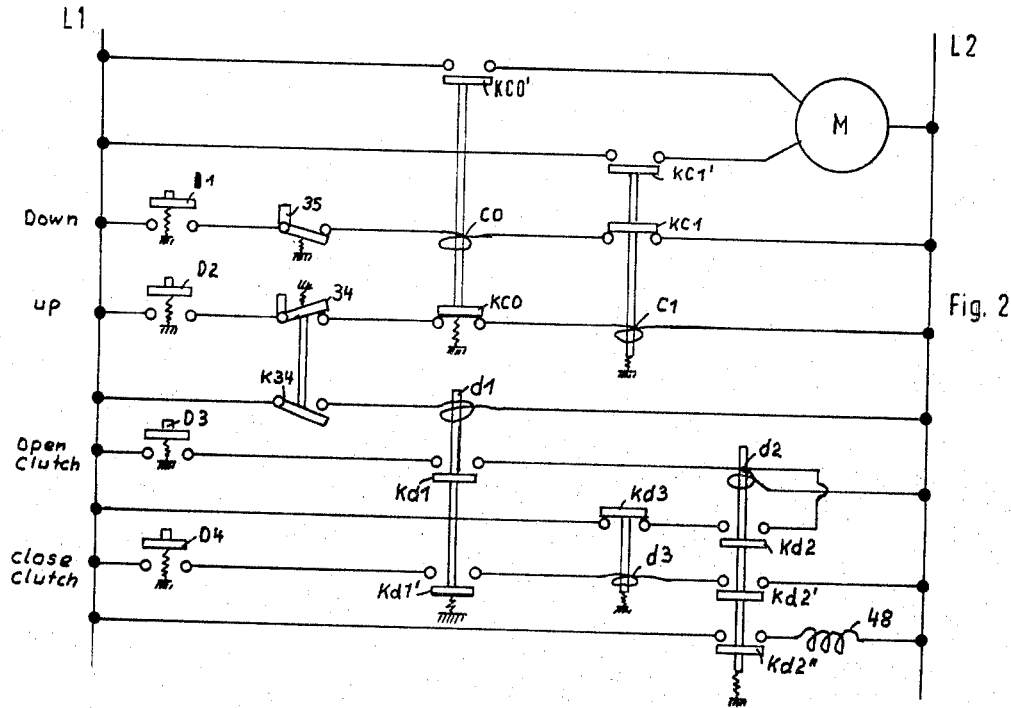
FIGURE 2 represents an electric diagram for the height adjusting device for both the filling container and the float.

The control circuit for the drive motor M and the clutch solenoid 48 is shown in FIGURE 2. In FIGURE 2, the motor M and the clutch solenoid 48, together with the actuating coils of relays C0, C1, $d1$, $d2$, and $d3$ are connected between power lines L1 and L2.

The coil of relay C0 is in series with the normally closed blade KC1 of relay C, normally closed limit switch 35 and normally open manual switch D1. Switch 35 is that one of switches 34, 35 which is engaged and opened by member 33 when the container is at the lower limit of its travel. Relay C0 has a normally closed blade KC0 in series with the coil of relay C1 and a normally open blade KC0' in series with motor M. Motor M is reversible and, when blade KC0' closes, will run in a direction to lower container 15.

The coil of relay C1 is in series with normally closed blade KC0 of relay C0, a normally closed blade of limit switch 34 and a normally open manual switch D2. Switch 34 is engaged and actuated by member 33 when the container is at the upper limit of its travel. Relay C1 has a normally closed blade KC1 in series with the coil of relay C0 and a normally open blade KC1' in series with motor M. When blade KC1' closes motor M is energized to run in a direction to elevate container 15.

Blades KC0 and KC1 interlock relays C0 and C1 so that only one at a time can be energized.

The raising and lowering movements of container 15, upon closing of one or the other of switches D1 or D2 will continue until the switch is released or until the container reaches an end limit position and one of switches 34, 35 is actuated by member 33.

Limit switch 34 has a second and normally open blade K34 which is in series with the coil of a relay $d1$ which has normally open blades K$d1$ and K$d1'$. Blade K34 closes when the container reaches its upper limit and member 33 engages and actuates limit switch 34.

Blade K$d1$, which closes when relay $d1$ is energized upon actuation of switch 34, is in series with normally open manual switch D3 and the coil of a relay $d2$. Relay $d2$ has normally open blades K$d2$, K$d2'$, and K$d2''$. Blade K$d2$, when closed, establishes a holding circuit for the coil of relay $d2$ around switch D3 and via the normally closed blade of a relay $d3$. Blade K$d2'$ is in series with the blade K$d1'$ of relay $d1$, a normally open manual switch D4 and the coil of a relay $d3$. Blade K$d2''$ is in series with clutch solenoid 48 and, when closed, energizes solenoid 48 and causes the clutch to open and disconnect the float drive from the container drive.

At this point it will be appreciated that relay $d2$ can be energized to cause energization of clutch solenoid 48 only when container 15 is at its upper limit of travel and switch 34 is actuated to close its blade K34 to thereby energize relay $d1$ to close its blade K$d1$. With blade K$d1$ closed, relay $d2$ can be energized by closing manual switch D3.

If manual switch D3 is not closed, the container and float drives remain connected so the container and float will move together. If relay $d2$ has been energized by the closing of switch D3, the said drive is interrupted and the container can be lowered by closing switch D1 while the float will remain in its upper position. The container can be lowered until switch 35 opens and is then in position for cleaning or servicing.

If relay $d2$ is energized, and the container is lowered from its uppermost position, switch 34 is released and its blade K34 will open and relay $d1$ is deenergized so as to open its blades K$d1$ and K$d1'$. Opening of blade K$d1$ is without effect because, if relay $d2$ is energized it is held by its blade K$d2$ and blade K$d3$ of relay $d3$.

The coil of relay $d3$ is in series with normally open manual switch D4, normally open blade K$d1'$ of relay $d1$ and normally open blade K$d2'$ of relay $d2$. Relay $d2$ has a single normally closed blade K$d3$ in the holding circuit of relay $d2$.

At this point it will be seen that, once relay $d2$ is energized to energize the clutch disengaging solenoid 48, it can only be deenergized by energizing relay $d3$ to open blade K$d3$ and that this can occur only when container 15 is at its upper limit to close blade K34 to energize relay $d1$ which latter then closes its blade K$d1'$ in the energizing circuit for relay $d3$. Thus, the drive to the float can be disconnected from the container drive only when the container is at its upper limit and can thereafter again be connected to the container drive only when the container is at its upper limit. The float and container thus always have a fixed relation to each other except when the float is held at the top of its stroke and the container is lowered for servicing. Accidental misadjustment of the float is thus eliminated.

It is, of course, to be understood that the present invention is, by no means, limited to the particular embodiment illustrated in the drawing but also includes any modifications within the scope of the appended claims. Thus, instead of the manually operable switches D3 and D4 for engaging and disengaging the clutch, it is possible so to combine these control means with the limit switches 34, 35 that the de-energization or energization of clutch 48 will be effected automatically.

Figure 3:
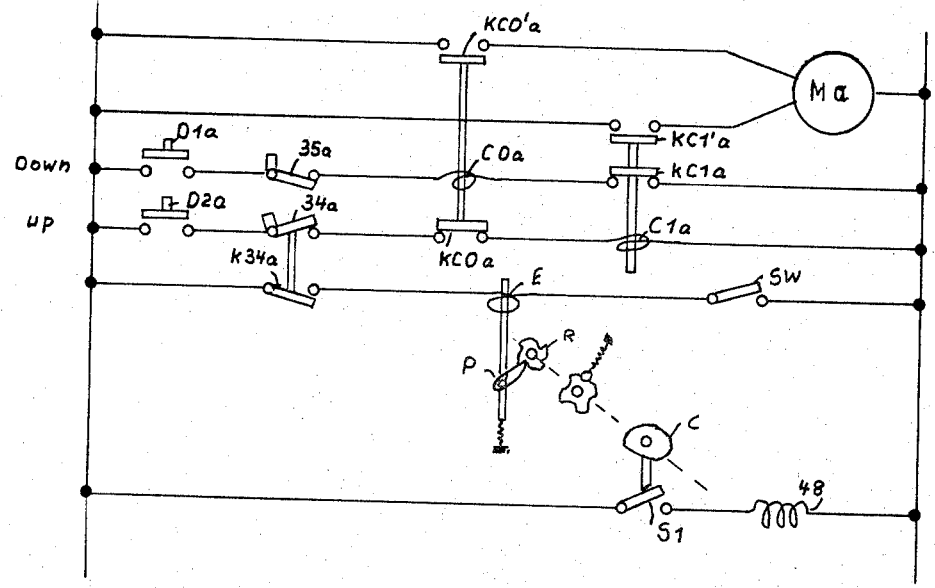
FIGURE 3 shows a modification of the electric circuit.

FIGURE 3 shows a circuit as referred to above. In FIGURE 3, those elements which are the same as those of FIGURE 2 have the same numeral with the addition of an *a*.

In FIGURE 3, solenoid 48 is controlled by a switch S1 which is opened and closed by a cam C. Cam C is connected to ratchet wheel R which is actuated by pawl P. Pawl P is, in turn, actuated by coil E. Each energization of coil E will cause ratchet wheel R to rotate 90°. Successive energization of coil E will thus cause switch S1 to close and open.

Coil E is connected to blade K34*a* of switch 34 so that by raising the container to its upper limit, solenoid 48 will be energized. The container can then be lowered independently of the float. When the container is again raised to its upper limit, solenoid 48 will be deenergized and the container and float will again be connected together. A manual selector switch SW can be adjusted to open position to prevent energization of coil E, if so desired.

It will be understood that this invention is susceptible to modification in order to adapt it to different usages and conditions; and accordingly, it is desired to comprehend such modifications within this invention as may fall within the scope of the appended claims.

What is claimed is:

1. In a bottle filling machine, especially a vacuum filling machine; a liquid container, first screw threaded means supporting said container and rotatable for adjusting the height of said container, a float in the container for controlling the liquid level in the container, second screw threaded means supporting said float and rotatable for adjusting the height of said float, a drive connection extending between said first and second screw threaded means for causing simultaneous rotation thereof so as normally to cause said container and float to move in unison and maintain a fixed relative position, a normally engaged clutch in said drive connection, a selectively energizable motor connected to one of said first and second screw threaded means, limit switch means in the motor energizing circuit operated when the container reaches its upper and lower limit positions to halt the motor, control means for said clutch selectively operable when effective for causing engagement or disengagement thereof, and further control means operated by movement of said container into one only of its extreme upper and lower limit positions for making said control means effective.

2. A bottle filling machine according to claim 1 wherein said clutch is solenoid operated into disengaged position and said control means includes an energizing circuit for the clutch solenoid and said further control means comprises a limit switch blade operatively associated with said energizing circuit and arranged to be actuated into position to control the closing and opening of said energizing circuit, said limit switch blade being actuated by movement of said container into its said one limit position.

3. A bottle filling machine according to claim 2 in which said energizing circuit has operatively associated therewith a first manual switch for closing said circuit and a second manual switch for opening said circuit.

4. A bottle filling machine according to claim 2 in which said limit switch blade is operable upon alternate actuations thereof to cause closing and opening respectively of said energizing circuit.

5. A bottle filling machine according to claim 2 in which said drive connection includes a first rotatable member connected to said first screw threaded means and a second rotatable member connected to said second screw threaded means, said rotatable members being in adjacent coaxial relation, clutch elements engaging both of said members and effecting positive interconnection thereof when the clutch is engaged, said clutch when disengaged withdrawing said elements from one of said members.

6. A bottle filling machine according to claim 5 in which said elements are pins extending through one of said members, a ring connected to the pins for moving them into and out of engagement with the other of said members, spring means biasing said ring toward clutch engaged position, and linkage connecting said ring with said clutch solenoid for actuation of the ring to clutch disengaged position by energization of said solenoid.

7. A bottle filling machine according to claim 6 in which said first screw threaded means pertaining to said container is a threaded rod, a nut engaging the rod, a sleeve supporting the nut, said first member being fixed to said sleeve, said second member being rotatable on said sleeve, said pins extending through said second member, said ring being reciprocably mounted on said sleeve on the side of said second member opposite said first member, a worm wheel fixed to said sleeve, and a worm engaging said worm wheel and connected to said motor.

8. A bottle filling machine according to claim 7 in which said second member is a sprocket and is connected by a chain to said second screw threaded member for said float.

9. A bottle filling machine according to claim 6 in which said first member is a sprocket, a threaded element having a second sprocket, a chain connecting said sprockets, an abutment element on said threaded element so rotation of said first member by said motor will cause said abutment element to move along said threaded element, said limit switch means being located to be actuated by said abutment element at the limits of the travel of said abutment element.

References Cited

UNITED STATES PATENTS

| 2,591,071 | 4/1952 | Huggins et al. | 141—152 |
| 2,597,791 | 5/1952 | Graham-Enock | 141—152 |
| 2,756,916 | 7/1956 | Kerr | 141—177 |
| 2,308,709 | 1/1943 | Newman | 192—142 |

FOREIGN PATENTS 540,950  11/1941  Great Britain.

LAURENCE M. GOODRIDGE, *Primary Examiner.*

C. M. LEEDOM, *Assistant Examiner.*